(12) United States Patent
Hynes et al.

(10) Patent No.: US 6,552,404 B1
(45) Date of Patent: Apr. 22, 2003

(54) INTEGRATABLE TRANSDUCER STRUCTURE

(75) Inventors: Eamon Hynes, Limerick (IE); John Wynne, Limerick (IE)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 09/836,809

(22) Filed: Apr. 17, 2001

(51) Int. Cl.[7] ............................................. H01L 29/82
(52) U.S. Cl. ........................ 257/415; 257/417; 257/420; 257/418; 438/50; 438/53
(58) Field of Search ............................. 257/414–420, 257/421; 438/50–53

(56) References Cited

U.S. PATENT DOCUMENTS

| 3,941,629 A | * | 3/1976 | Jaffe | 257/419 |
|---|---|---|---|---|
| 4,849,071 A | * | 7/1989 | Evans et al. | 438/53 |
| 5,095,401 A | * | 3/1992 | Zavracky et al. | 361/283 |
| 5,177,579 A | * | 1/1993 | Jerman | 257/419 |
| 5,470,797 A | * | 11/1995 | Mastrangelo | 257/419 |
| 5,493,470 A | * | 2/1996 | Zavracky et al. | 257/419 |
| 5,677,560 A | * | 10/1997 | Zimmer et al. | 257/418 |
| 5,912,499 A | * | 6/1999 | Diem et al. | 257/419 |
| 5,959,338 A | * | 9/1999 | Youngner et al. | 257/419 |
| 6,030,851 A | * | 2/2000 | Grandmont et al. | 438/53 |
| 6,058,782 A | * | 5/2000 | Kurtz et al. | 257/418 |
| 6,320,239 B1 | * | 11/2001 | Eccardt et al. | 257/415 |
| 6,326,682 B1 | * | 12/2001 | Kurtz et al. | 257/415 |

* cited by examiner

Primary Examiner—David Nelms
Assistant Examiner—Andy Huynh
(74) Attorney, Agent, or Firm—Wolf, Greenfield & Sacks, PC

(57) ABSTRACT

Electro-mechanical structures and methods for forming same are disclosed. The structures are integratable onto an integrated circuit. The structures have a deformeable element formed in a plane substantially perpendicular to the substrate of the integrated circuit.

26 Claims, 21 Drawing Sheets

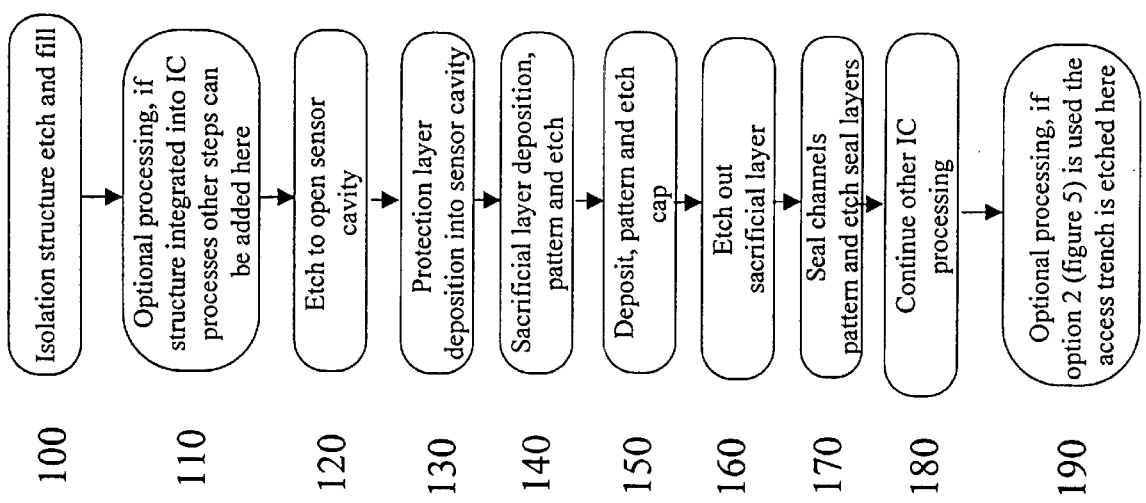

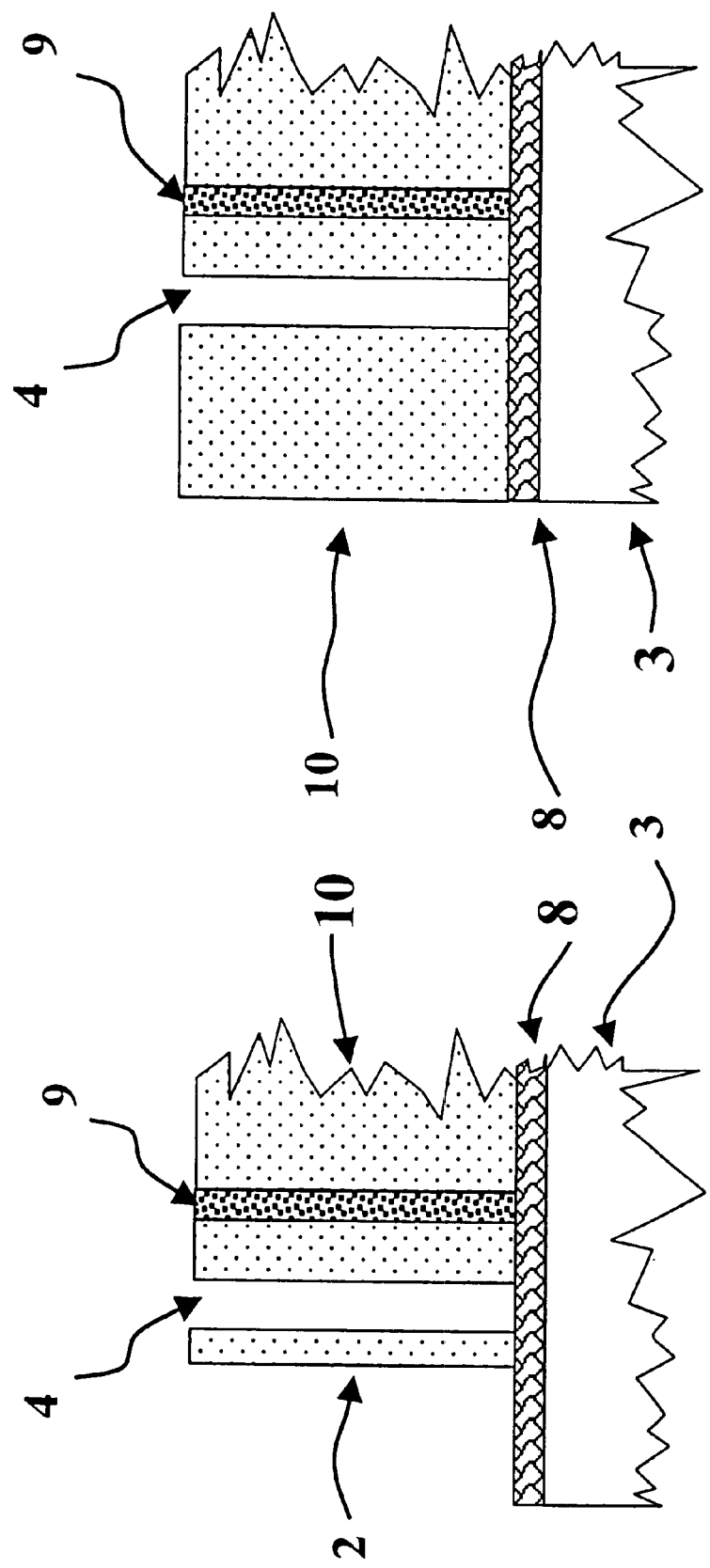

INTEGRATABLE TRANSDUCER STRUCTURE

FIELD OF THE INVENTION

This invention relates generally to electromechanical structures and in particular to electromechanical structures having a deformable element, the structure being integratable onto an integrated circuit.

BACKGROUND OF THE INVENTION

Many types of electromechanical structures have been incorporated into integrated circuits. For example, the concept of a structure comprising a sealed cavity formed using semiconductor processing techniques with a suspended membrane whose deformation or deflection allows its use as a sensor or actuator is known in the literature. U.S. Pat. Nos. 4,744,863 and 4,853,669 granted to Guckel et al., U.S. Pat. Nos. 5,321,989 and 5,431,057 granted to Zimmer et al., and U.S. Pat. No. 5,316,619 granted to C. H. Mastrangelo discloses some form of this approach to realise pressure sensors. In all known cases, including the above, the sensor is a planar structure in parallel to the silicon substrate which typically forms the bottom plate of the sensor.

In the patents listed above, a pressure sensing diaphragm is formed using a deposited layer onto the chip surface. The use of silicon over a sacrificial buried oxide layer to create micromechanical elements is also known in the literature, such as that described in U.S. Pat. No. 5,677,560, granted to Zimmer et al. which etches out a buried oxide to create micromechanical structures. This structure uses the active silicon layer above the buried oxide to create the micromechanical diaphragm.

In all of the prior art described above, the plane of the deformeable element (the diaphragm) is parallel to the surface of the integrated circuit.

Known implementations of micromechanical structures that are fabricated in the same plane as the surface of the integrated circuit (e.g. diaphragm-type pressure sensor) consume considerable surface area on the integrated circuit. In addition, known methods of implementing sensors on silicon are highly process dependent. Accordingly, a need arises for an electromechanical structure that occupies minimal surface area, and can be easily scaled into different process generations.

SUMMARY OF THE INVENTION

These needs and others are addressed by the electromechanical structure of the present invention. The electromechanical element of the present invention includes a deformeable element. In one embodiment, the invention provides an electromechanical structure being a transducer that realises a mechanical diaphragm in silicon. The structure can be incorporated onto an integrated circuit manufactured through a standard semiconductor manufacturing process. The diaphragm can be used as a sensor or actuator.

The deformeable element is formed in a plane perpendicular to the surface of the integrated circuit by etching one or more trenches into the silicon. In the case where two parallel trenches are etched the silicon "wall" between the two trenches forms a diaphragm. The top of one of the trenches is sealed under vacuum conditions to form an evacuated cavity while the other trench is left open. The silicon "wall" now has a vacuum cavity on one side and the other side is open to ambient pressure.

This wall forms a "deflectable" or "deformeable" diaphragm of a sensor. Ambient pressure changes deflect the diaphragm, and the deflection is proportional to the pressure difference between the ambient pressure and the vacuum cavity. The deformation of the diaphragm can be measured directly as a variation in the electrical characteristics of the structure, thereby serving as a sensor. Alternatively, the diaphragm can be excited electrically to serve as an actuator. In the case where both trenches are sealed under vacuum conditions the silicon wall between the two can be excited electrically to serve as a resonator or mechanical filter.

In the case where the etch forms a single column of silicon surrounded by a trench the trench can be sealed under vacuum and the column can be contacted electrically. This sealed column can be used as a resonator or mechanical filter.

A main advantage of the structure arises from the fact that the deformeable element is substantially perpendicular to the surface of the integrated circuit. This allows large deformeable elements to be manufactured while consuming very little surface area of the integrated circuit. This approach is very cost effective and will scale with all process technologies.

Accordingly the invention provides an integrated circuit comprising:
  a substrate having an upper surface defining a first plane;
  an electromechanical element including a deformeable element defining a second plane;
  such that the first and second planes intersect.

The first and second planes are preferably substantially perpendicular with respect to one another.

The deformeable element is typically insulated from the upper surface of the substrate.

In one embodiment the deformeable element is preferably responsive to applied pressure, said applied pressure effecting a change in the electrical characteristics of said electromechanical element.

In another embodiment the deformeable element can be electrostatically actuated to create a resonator or mechanical filter.

In one embodiment, the deformable element is a transducer diaphragm forming a first wall of an evacuated cavity, an outer portion of the first wall being exposed to ambient pressure conditions and an inner portion of the first wall being exposed to an evacuated cavity, such that changes in ambient pressure with respect to the evacuated cavity effects a deflection of the diaphragm in the vertical plane, such deflection being electrically measurable.

The transducer diaphragm preferably forms a first wall of an evacuated cavity, the cavity having a second wall, the second wall of the cavity being electrically insulated from the first wall, such that on application of a signal between the first wall and the second wall the diaphragm is actuated, the actuation of the diaphragm resulting in the diaphragm vibrating mechanically.

The frequency of the diaphragm vibration typically is modulated by the frequency of the applied signal.

The invention also provides a method of forming an electromechanical structure onto an integrated circuit comprising the steps of:
  forming an evacuated cavity in an active device layer of the integrated circuit, and wherein a wall of the cavity or a column within the cavity is substantially perpendicular to the substrate of the integrated circuit and is deformable.

The deformation of the wall of the cavity or the column within the cavity is desirably actuated by application of a signal to electrically excite the side wall or column, or having one side of the wall being exposed to a sealed cavity and the other side responsive to ambient pressure such that any changes in ambient pressure effect a deformation of the side wall.

The method preferably further comprising the steps of electrically isolating the electrochemical structure from the remaining integrated circuit.

By sensing any deformation of the wall resultant from fluctuations in pressure between the ambient pressure and the evacuated cavity, the method of the invention may also be used to form a pressure sensor on an integrated circuit.

The application of a signal between the deformable side wall and a second wall of the evacuated cavity, or between a column within the cavity and the wall of the cavity may be used to actuate the deformable side wall or column. This actuation results in the vibration of a wall or column, the characteristics of the vibration being defined by the applied signal and the mechanical dimensions of the vibrating wall or column, and may be used to form an actuator or resonator on an integrated circuit.

In accordance with one embodiment of the present invention, a method of forming an evacuated cavity in the active device layer of the integrated circuit comprises the steps of:

i) etching a trench in the device layer, the trench being etched in a plane substantially perpendicular to the substrate, ii) filling the trench with a sacrificial material, iii) forming a cover over the filled trench, and iv) etching the sacrificial material previously deposited from the trench, and sealing the trench.

The column resonator of the present invention is formed in a plane perpendicular to the surface of the integrated circuit by etching in a pattern that creates a standing silicon column surrounded on all sides by a trench. The trench surrounding the column can be sealed in a similar manner to the previous embodiments to form an isolated column standing in a vacuum cavity supported at the top and bottom only.

In this case, a filled isolation trench is formed in the silicon outside the etched trench, and encloses it completely. This allows outside walls of the trench to be electrically biased with respect to the silicon column, allowing the column to be actuated and resulting in the column vibrating mechanically.

These and other features and advantages of the present invention will be better understood with relation to the accompanying drawings.

BRIEF DESCRIPTION OF THE DRAWINGS

FIG. 2 is a flow chart of method steps used to fabricate the device of FIG. 1, FIGS. 3a and 3b are sections through a silicon wafer showing the formation of an isolation trench, FIG. 4 is a section through the device of FIG. 3b showing a first option for forming a device of the present invention, FIG. 5 is a section through the device of FIG. 3 showing a second option for forming a device of the present invention.

DETAILED DESCRIPTION OF THE INVENTION

In accordance with the present invention, an electromechanical element is described that provides distinct advantages when compared to those of the prior art. The diagrams included show the structure of four embodiments of the invention; in all embodiments described buried oxide silicon on insulator (SOI) wafers are used as starting material.

Figure 1:
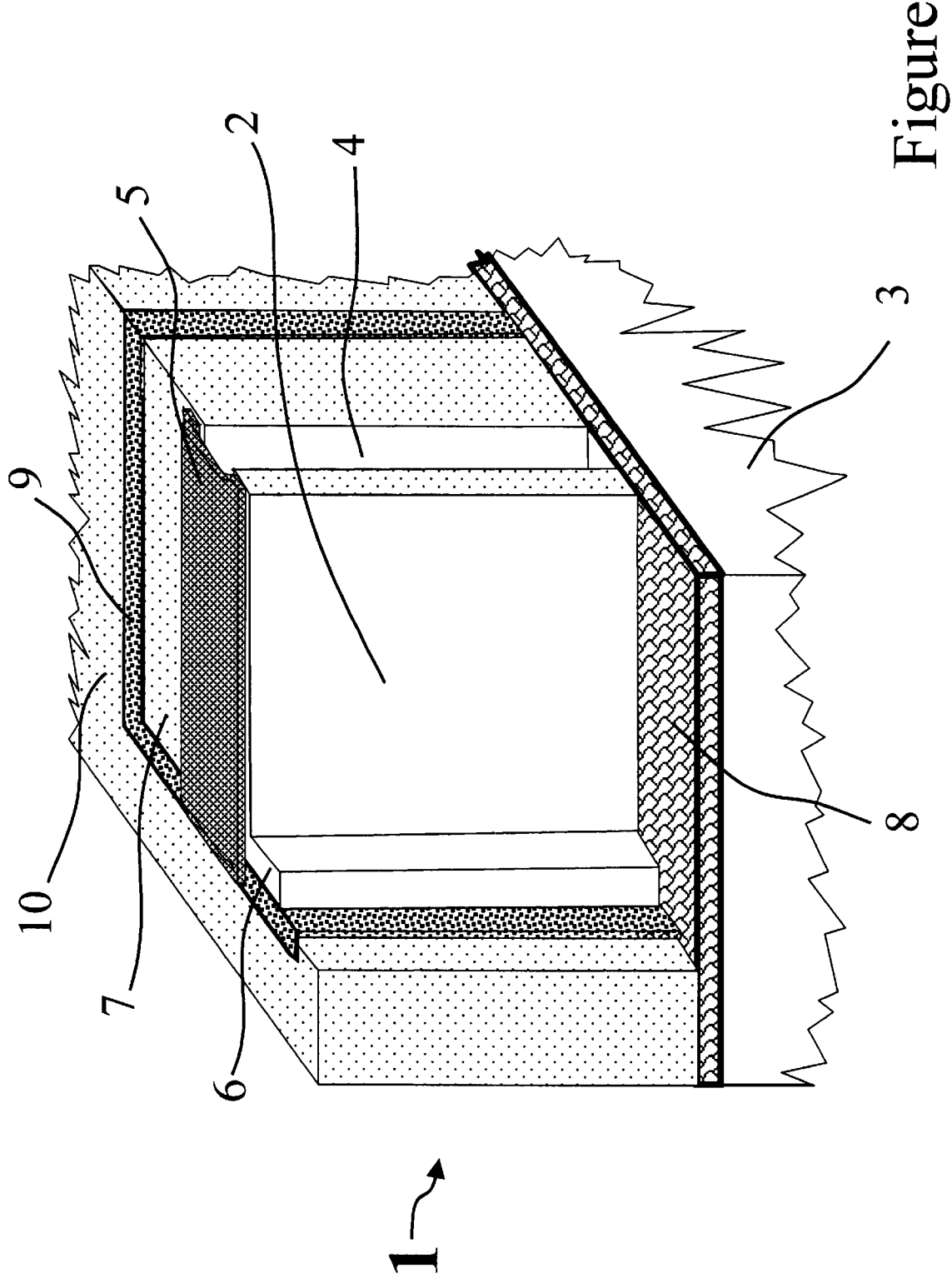
FIG. 1 is a perspective view of a cross-section through a transducer device in accordance with one embodiment of the present invention.

FIG. 1 is a partial perspective view illustrating a cross-section of a transducer 1 in accordance with one embodiment of the present invention. It comprises a mechanical diaphragm 2 formed in a vertical plane substantially perpendicular to a silicon substrate 3. A sealed evacuated cavity is formed at one side of this diaphragm 2 by sealing the top of an etched trench 4 with a polysilicon layer 5. The other side of the diaphragm is open to the ambient pressure, with the resultant effect that changes in ambient pressure (with respect to the evacuated reference cavity 4) will cause deflection of the diaphragm 2 normal to the vertical plane in which the diaphragm lies. The deflection of the diaphragm 2 can be sensed electrically as a capacitance change between the electrical contact 6 to the diaphragm 2 and the electrical contact 7 to the back plate or as a change in electrical resistance of the diaphragm 2. The diaphragm 2 can also be electrostatically actuated by applying a signal between the electrical contact 6 to the diaphragm 2 and the electrical contact 7 to the back plate. To electrically isolate this transducer structure 1 from the substrate 3 it may be fabricated on a buried oxide layer 8. To isolate it from surrounding circuitry, a vertical isolation trench 9 surrounds the diaphragm 2 and the capacitor back plate. Although not illustrated in FIG. 1, it will be appreciated by those skilled in the art that standard integrated circuits can be manufactured in the silicon area 10 outside the isolation trench and connected directly to the transducer.

FIG. 2 is a flow chart of method steps used to fabricate the device 1 in accordance with one embodiment of the present invention. FIGS. 3 to 12 illustrate the formation of the device 1 in accordance with the process steps of FIG. 2.

Figure 3B:
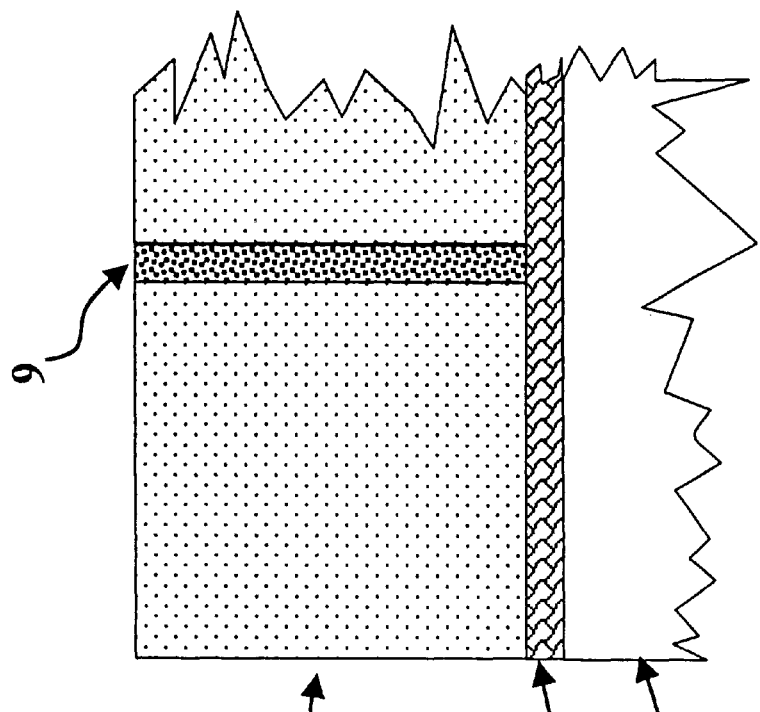
Figure 3A:
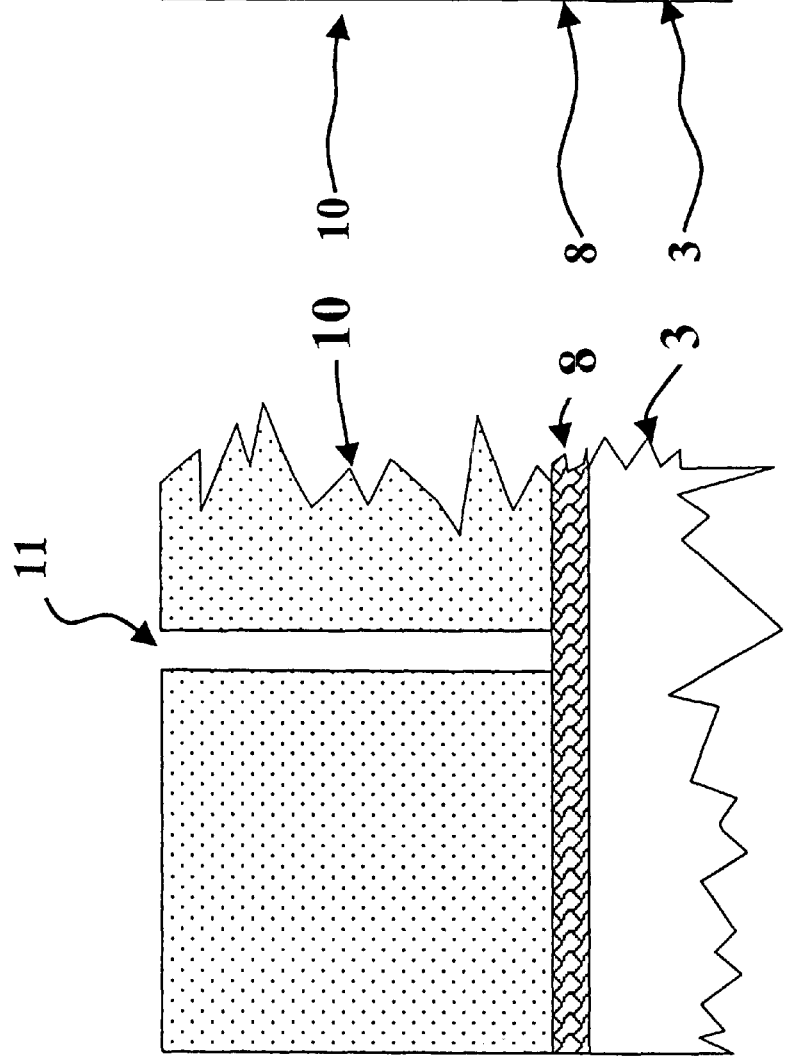

Initially, as shown in FIGS. 3a and 3b, an isolation trench 9 is formed in a silicon device layer 10 (Step 100). FIG. 3a shows the etching of the silicon 10 to form a trench 11 down to the buried layer 8. The trench 11 is then filled with an insulating material, such as silicon dioxide, to form the isolation trench 9.

The wafer is then processed, preferably through a standard IC process, to generate circuits in the surrounding silicon 10 (Step 110). Typically, the high temperature steps are performed at this stage before the remainder of the sensor processing. Alternatively, the sensor processing can be continued without interruption, in which case step 100 would be followed directly by step 120.

FIGS. 4 and 5 illustrate two possible options for initiating the formation of the diaphragm 2 (Step 120). In FIG. 4, the silicon 10 is etched to form both a trench 4 that is used to form the sealed cavity, and the trench that remains open to ambient conditions so as to form the active surface 2 of the diaphragm. FIG. 5 shows a preferred option and embodiment wherein only the trench 4 that forms the sealed cavity is formed at this juncture. The trench that is open to ambient conditions is created at the end of the process. The advantage of this latter option is that, if both trenches are open, it is difficult to remove material from the open trench during subsequent processing. There is however a disadvantage in following this option, in that the opening of the second trench at the end of the process introduces added steps to the process and may result in variations in the diaphragm thickness due to alignment variations. The embodiment of the option of FIG. 5 will be assumed for the remaining process steps.

Figure 6:
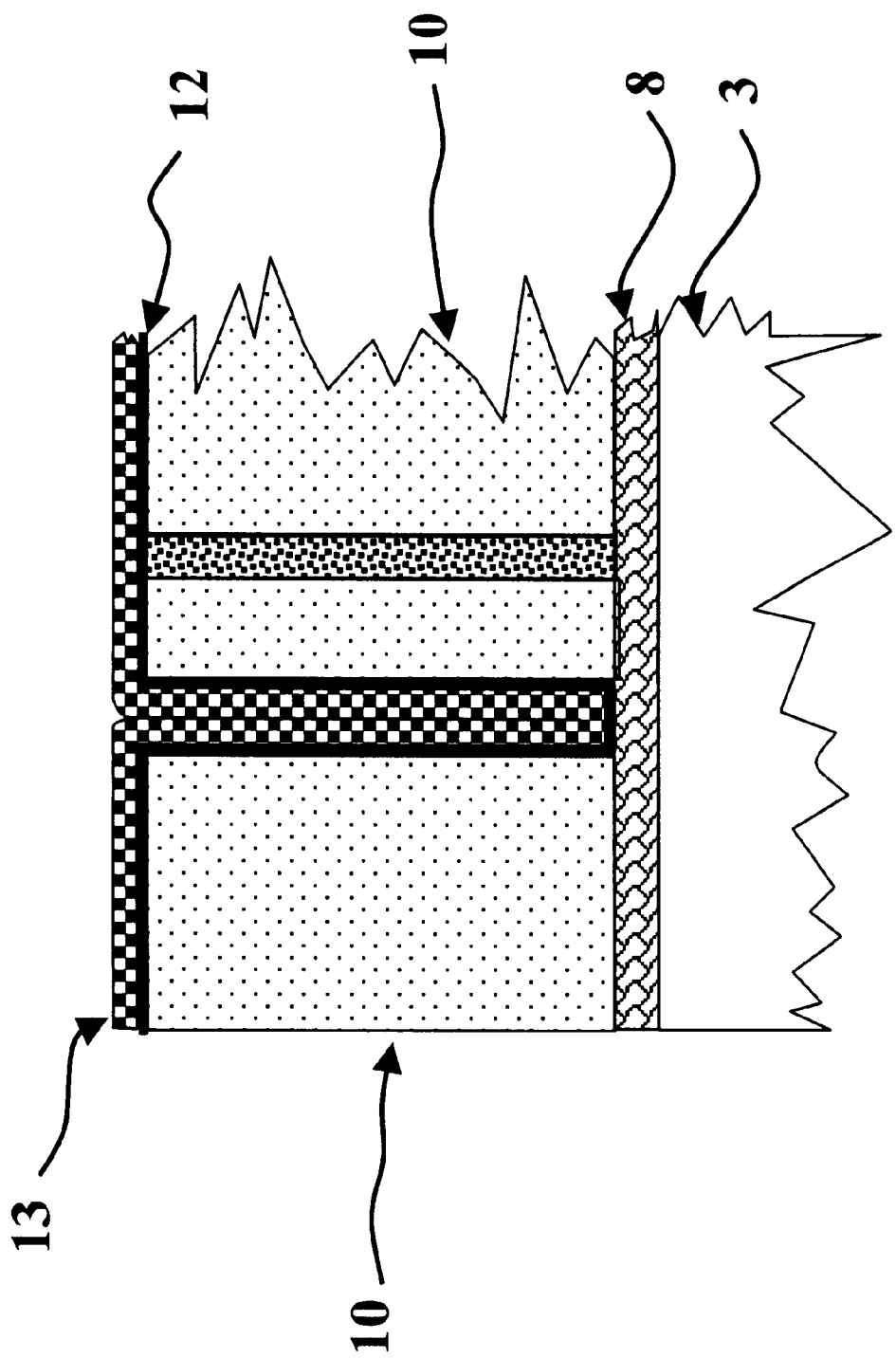
FIG. 6 shows the device of FIG. 5 with a deposited protection layer and sacrificial layer.
Figure 7:
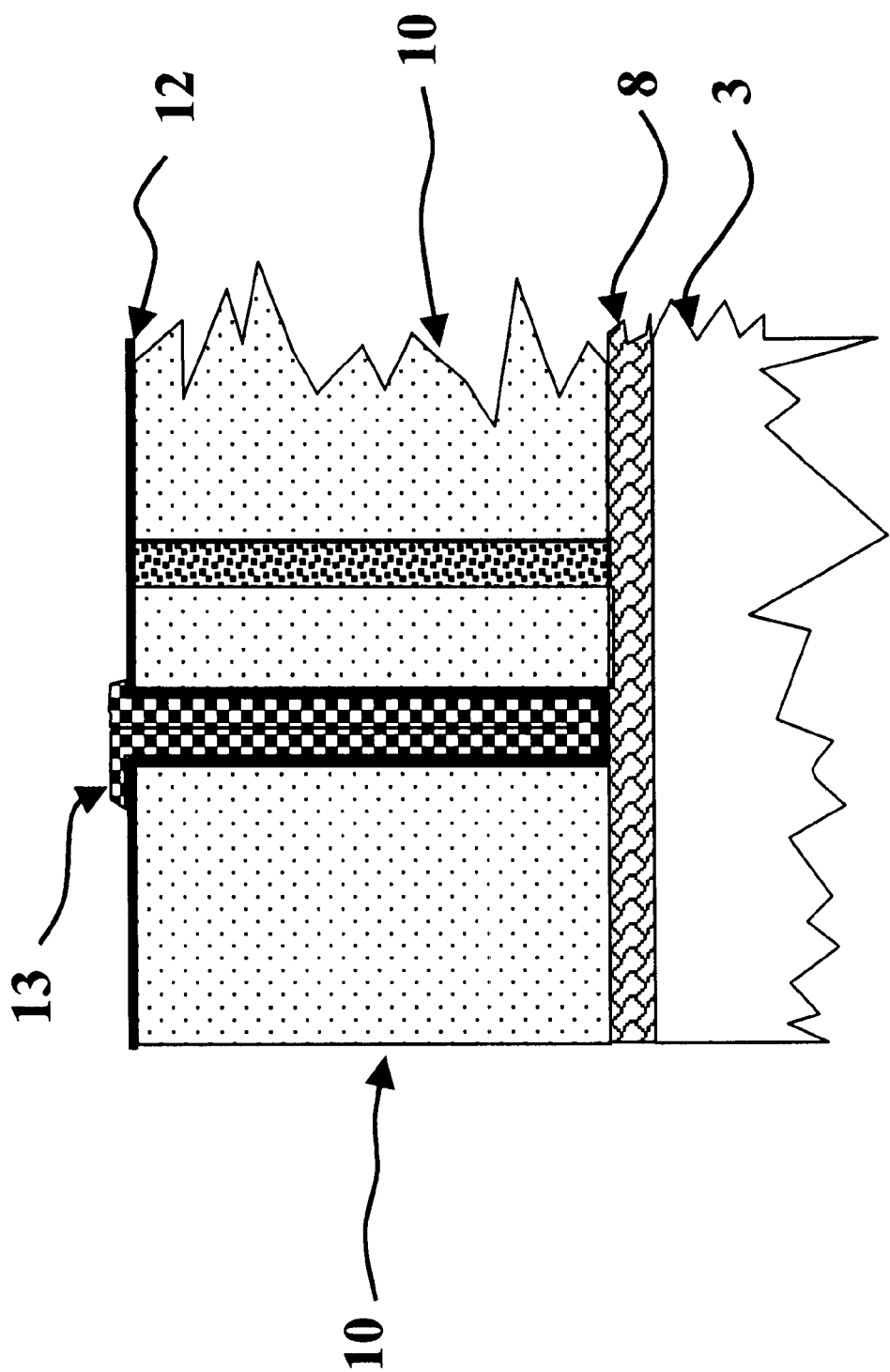
FIG. 7 shows the device of FIG. 6 after the sacrificial layer has been patterned and etched.

A nitride protection layer 12 is then applied prior to the filling of the trench 4 with a sacrificial oxide layer 13, as shown in FIG. 6 (and Step 130). After the trench 4 is filled, the sacrificial oxide layer 13 is patterned and etched. A partial etchback of the oxide 13 may be used to thin the oxide 13 prior to patterning and etching it, as shown in FIG. 7 (and Step 140).

In Step 150, a layer 5 is deposited, patterned and etched to create a "cover" over the trenches. This modification to the device of FIG. 7 is shown in FIG. 8

Figure 8:
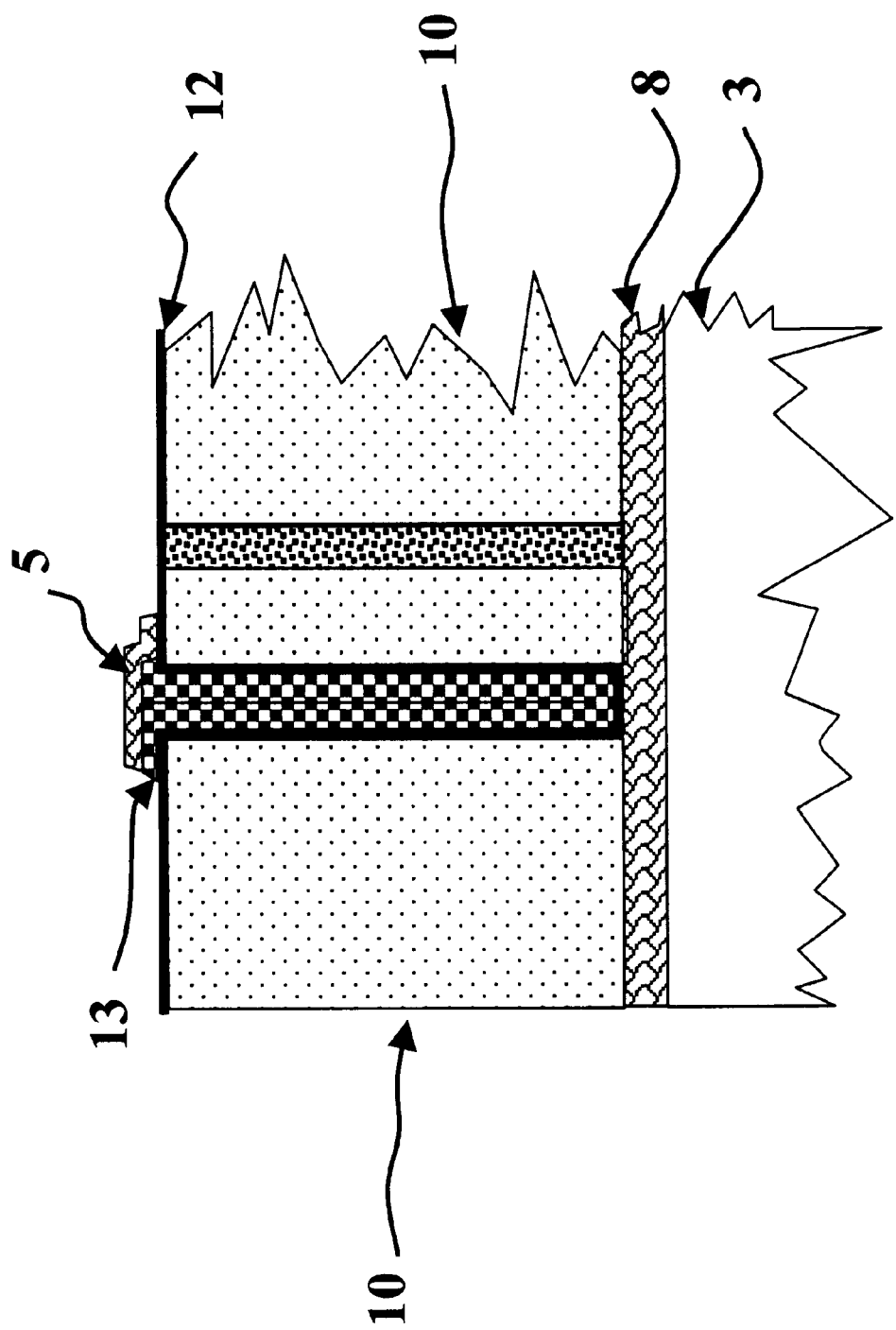
FIG. 8 shows the device of FIG. 7 with a cap layer formed on the sacrificial layer.
Figure 9:
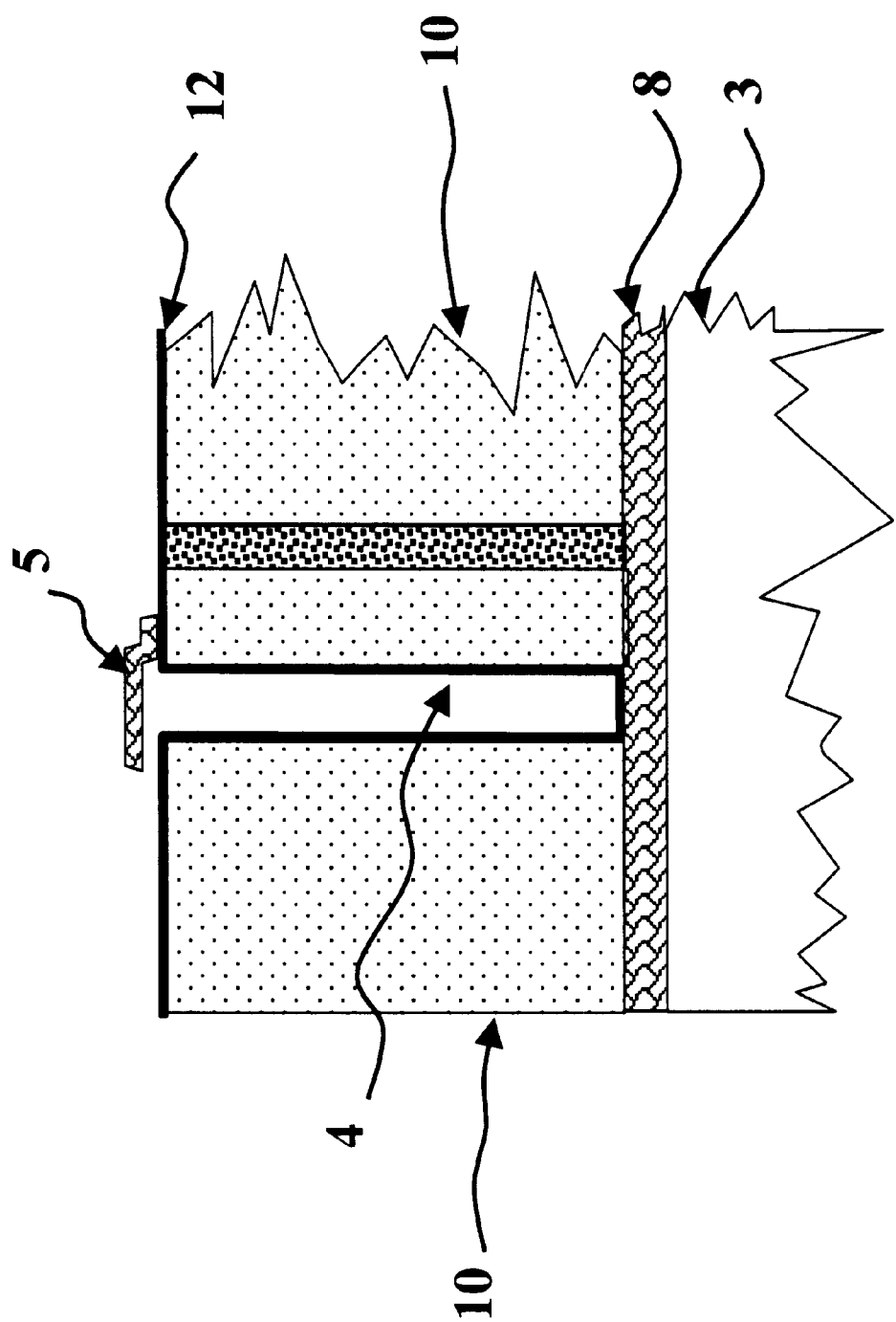
FIG. 9 shows the device of FIG. 8 after the etching of the sacrificial layer to form a cavity.
Figure 10:
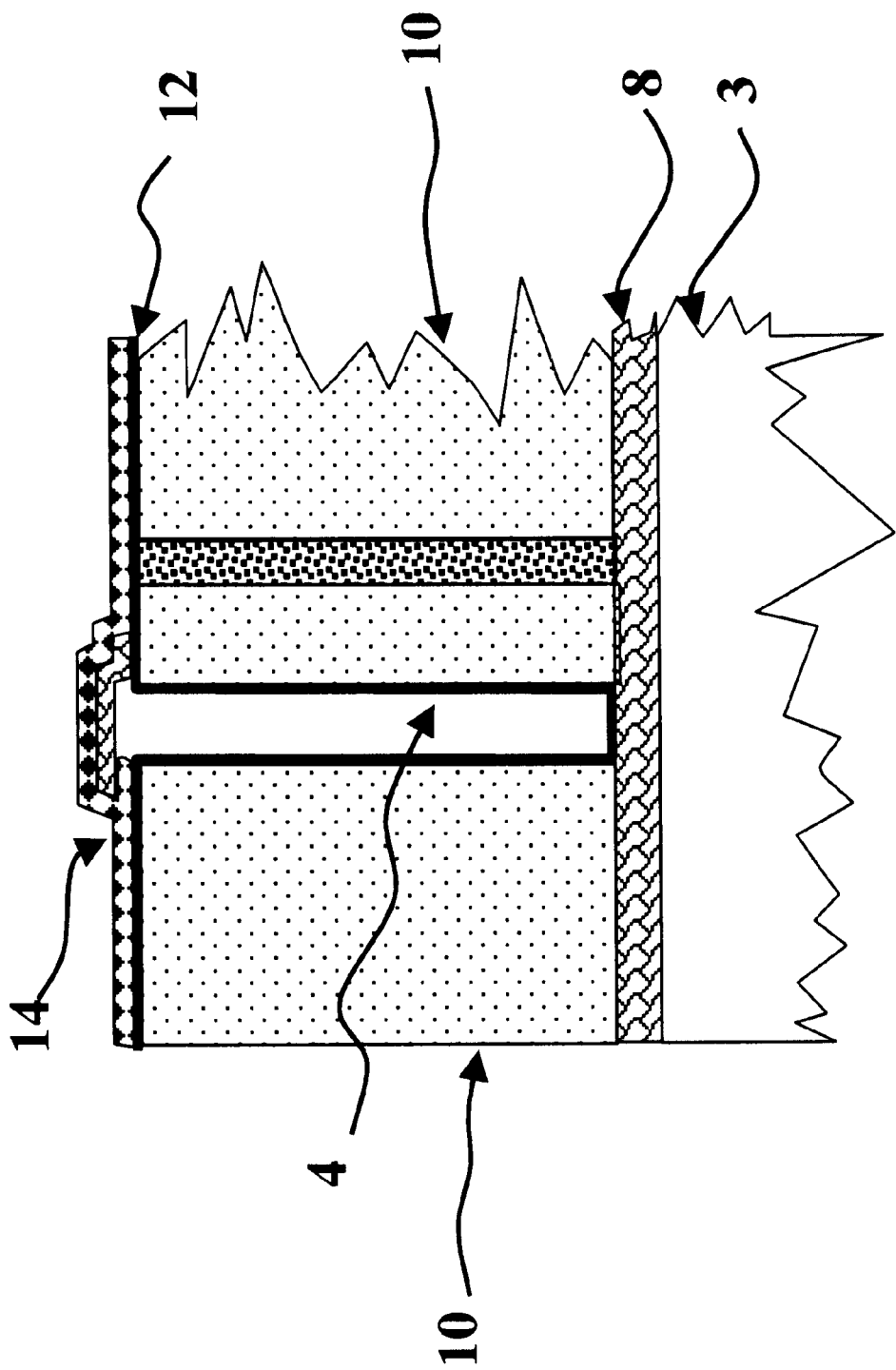
FIG. 10 shows the device of FIG. 9 after the cavity has been sealed.
Figure 11:
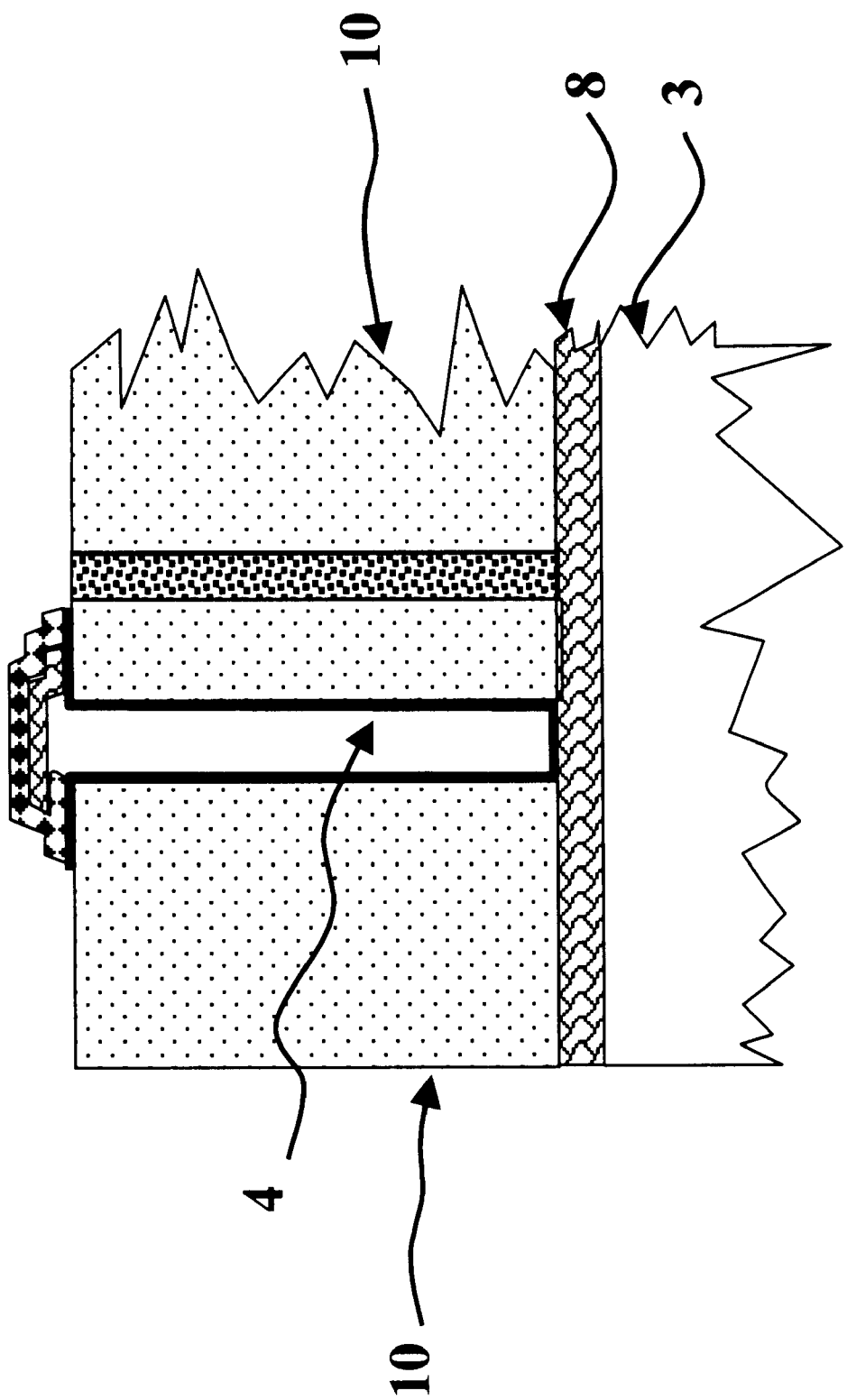
FIG. 11 shows the etched and patterned device of FIG. 10.

The sacrificial layer 13 of FIG. 8, is etched out of the trench (Step 160) and the trench is sealed with a sealing layer 14 creating a vacuum cavity 4, as shown in FIGS. 9 and 10. It is then necessary to pattern and etch the sealant and protective nitride layers, as shown in FIG. 11 (Step 170).

Figure 12:
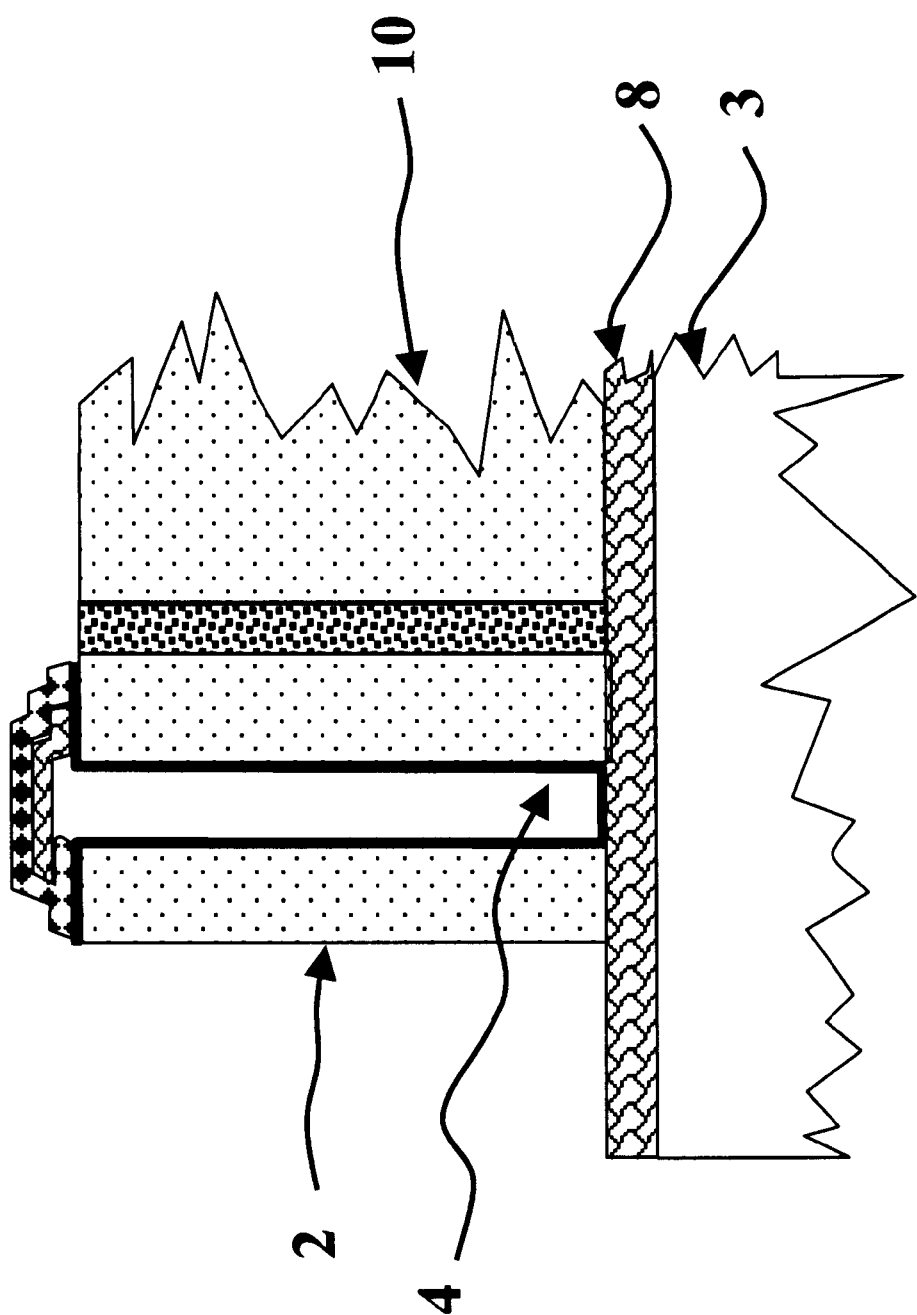
FIG. 12 shows the device of FIG. 11 after the removal of silicon to form an active surface.

If the second embodiment, i.e. the process flow illustrated in FIG. 5, is followed, it is now necessary to remove silicon 10 adjacent the sealed cavity 4 to form the diaphragm active surface 2, as shown in FIG. 12 (Step 190).

Figure 13:
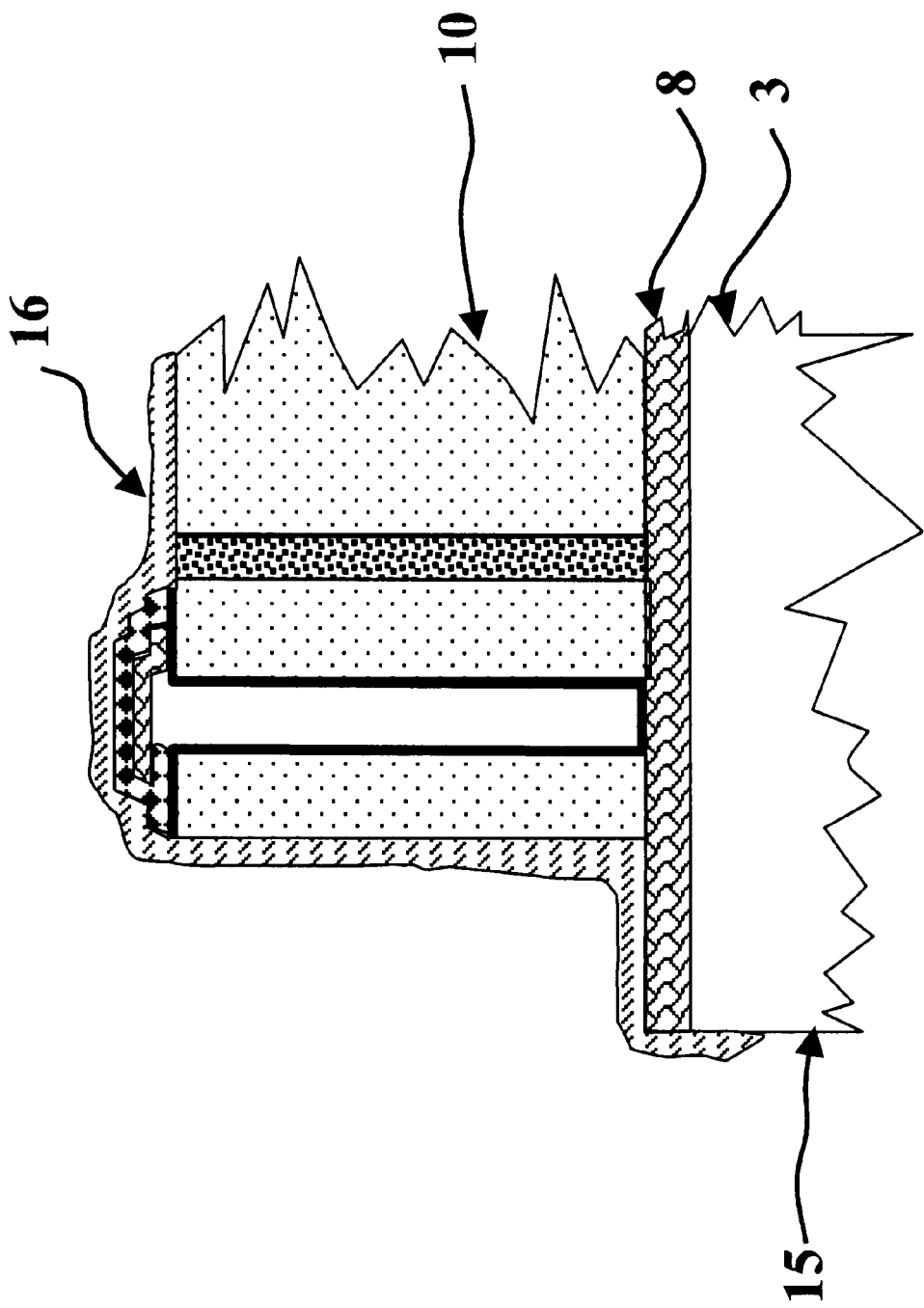
FIG. 13 shows a second embodiment in accordance with the present invention.

The description above outlines the general structure. A specific implementation, which is very useful, is to build the structure adjacent to the saw line 15 (FIG. 13) of a silicon chip. This creates a diaphragm at the edge of the chip just inside the saw line 15. The advantage is that a protective coating (e.g., gel coat 16) can be deposited on the chip after packaging without compromising sensitivity. Such coatings are necessary for many pressure sensor applications, and if deposited into an open cavity within a silicon chip, rather than at the edge, would fill the trench and reduce the sensitivity of the sensor.

FIGS. 14 to 19 illustrate a third embodiment of the present invention and the same reference numerals will be used with reference to equivalent structures. This third embodiment may be processed using the same process flow steps described above with reference to the description of the manufacture of the first embodiment, the difference being in the application of different masks so as to achieve a variation on the finished structure.

Figure 14:
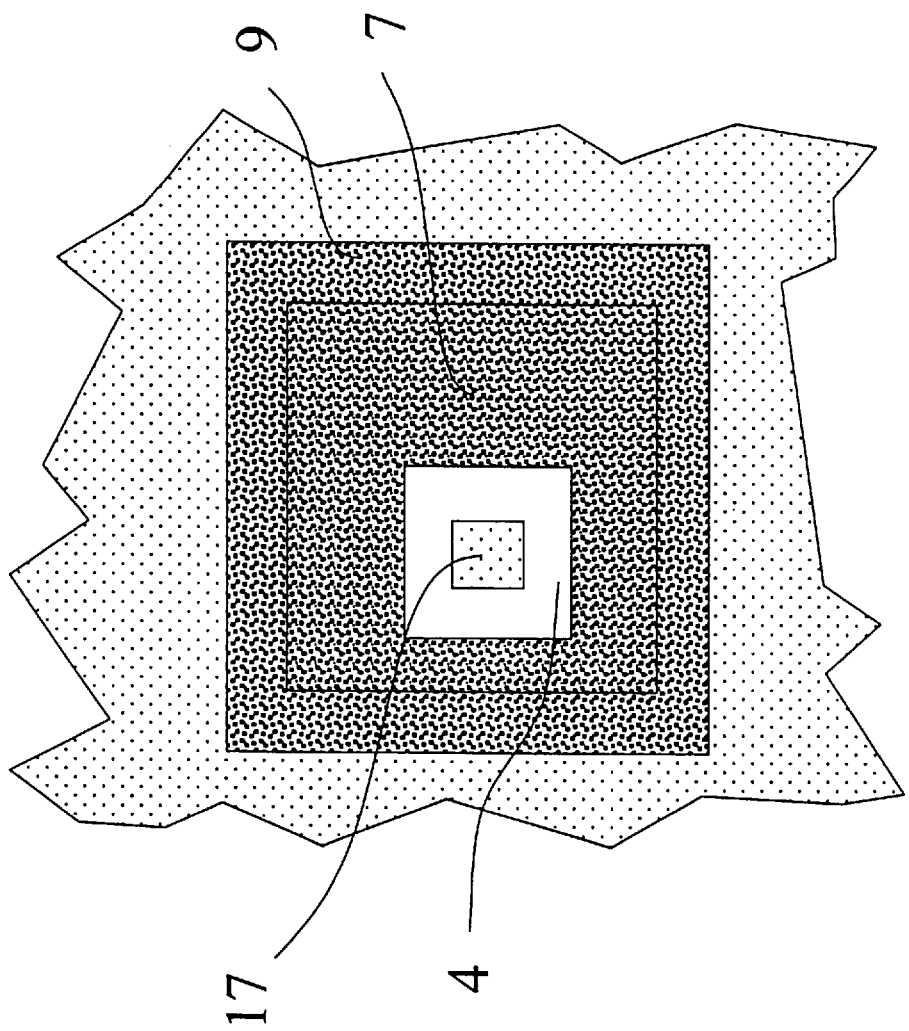
FIG. 14 shows a plan view of a third embodiment in accordance with the present invention.

As shown in FIG. 14, the isolation trench 9 is formed initially as in the previous descriptions and will serve to isolate the final structure from surrounding circuitry. Then a trench 4 is etched down to the buried oxide in a pattern that results in a column of silicon 17 being formed. Using the sealing process already described, this etched trench is then sealed with a cap 5 to form a vacuum cavity 4 around the silicon column 17. Standard IC processing techniques are preferably used to realise an electrical contact 18 to the isolated silicon column and an electrical contact 19 to the enclosing silicon 7 inside the isolation trench 9, as shown in FIG. 15.

Figure 15:
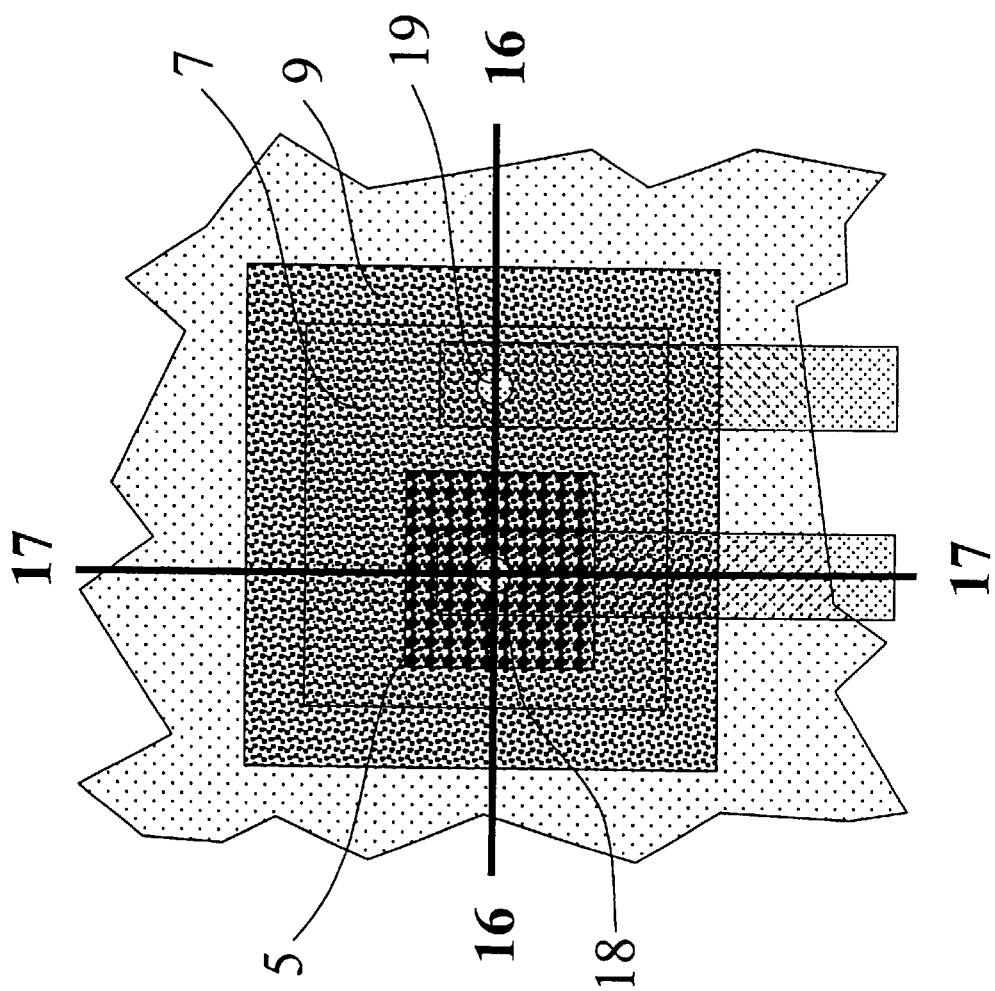
FIG. 15 is a further plan view of the device of FIG. 14 showing the application of electrical contracts.
Figure 16:
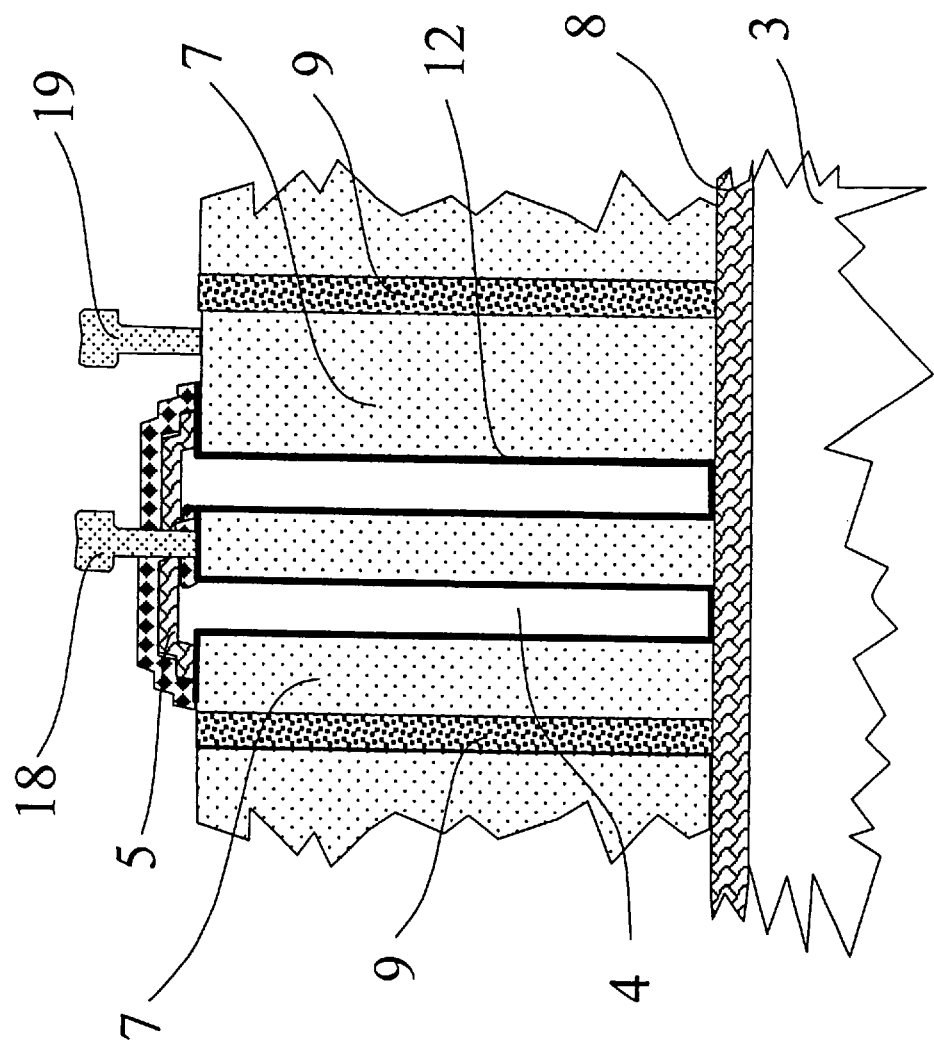
FIG. 16 is a section through the device of FIG. 15 along the line 16—16.
Figure 17:
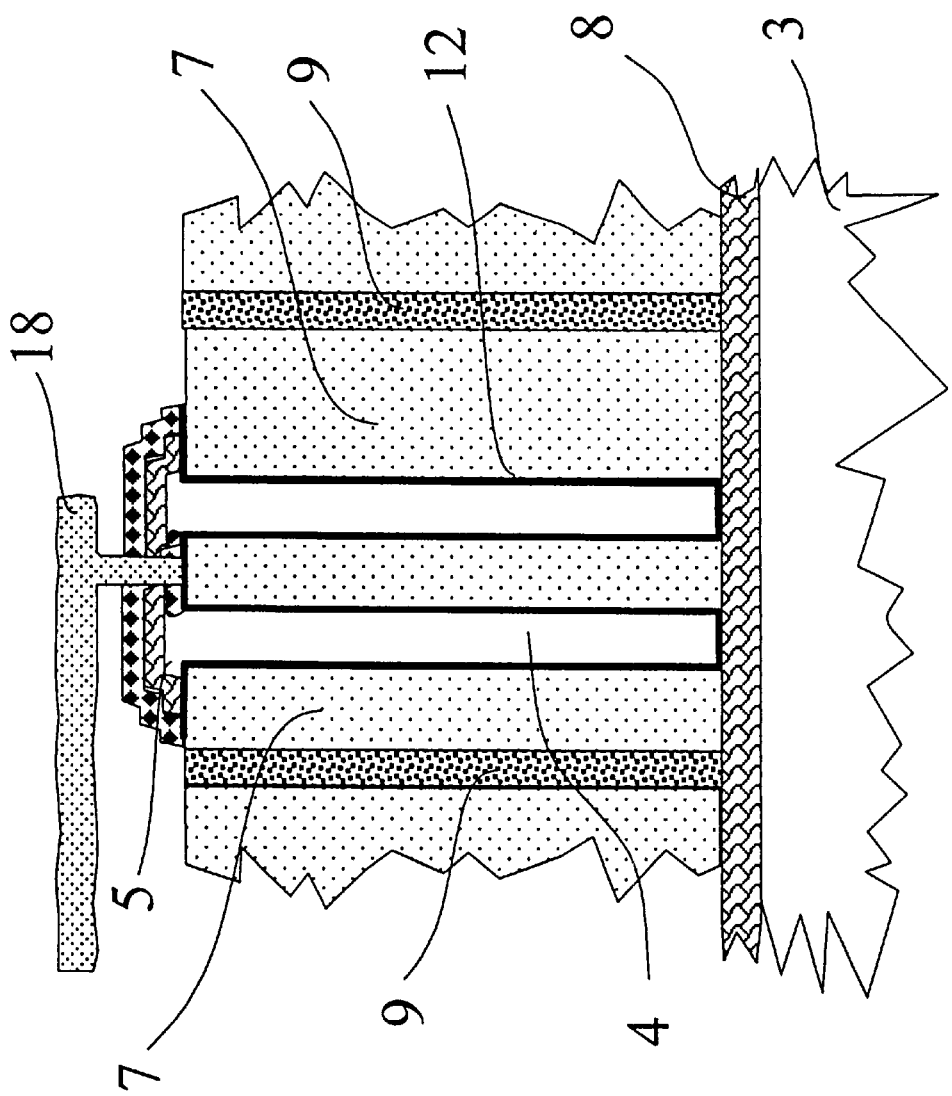
FIG. 17 is a section through the device of FIG. 15 along the line 17—17.

FIG. 16 is a cross-section representation of FIG. 15 along the 16—16 plane, and FIG. 17 is a cross-section representation of FIG. 15 along the 17—17 plane. An electrical signal applied between the electrical contacts 18 and 19 generates an electrostatic field resulting in vibration of the column 17.

Figure 18:
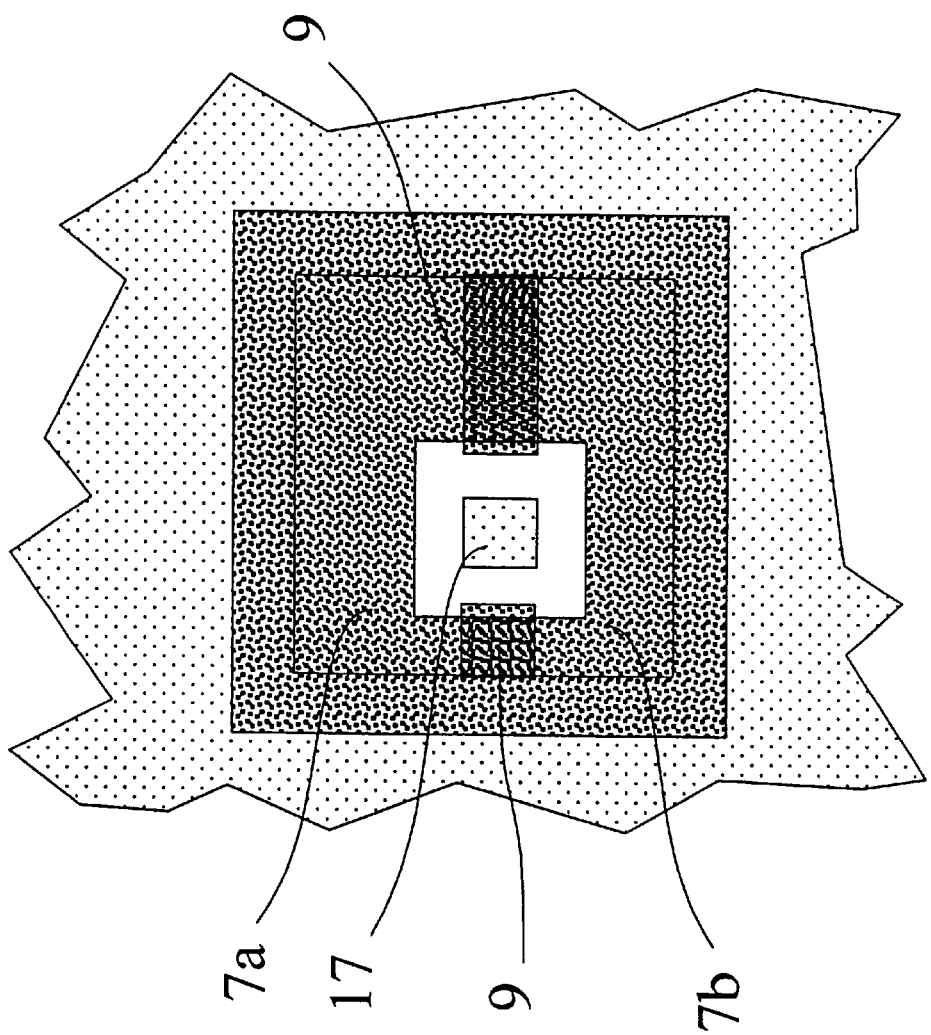
FIG. 18 is a plan view of a modification to the device of FIG. 15.
Figure 19:
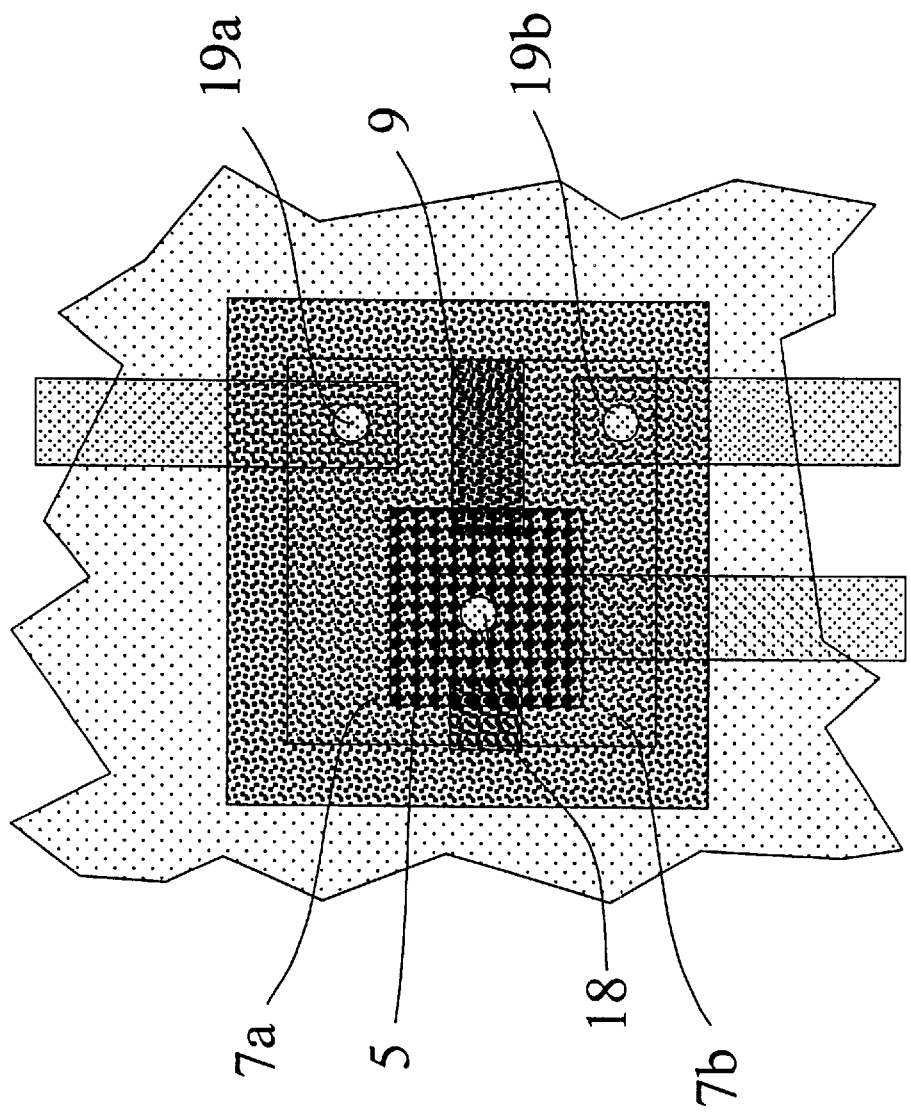
FIG. 19 is a plan view of a further modification to the device of FIG. 18.

In a further refinement, where it would be useful to separate the driving circuit and sensing circuit, FIGS. 18 and 19 illustrate an arrangement in which the isolation trench 9 is used to create two electrically isolated regions 7a and 7b enclosing the column 17. Separate isolated contacts 19a and 19b make connections to these two regions.

Figure 20:
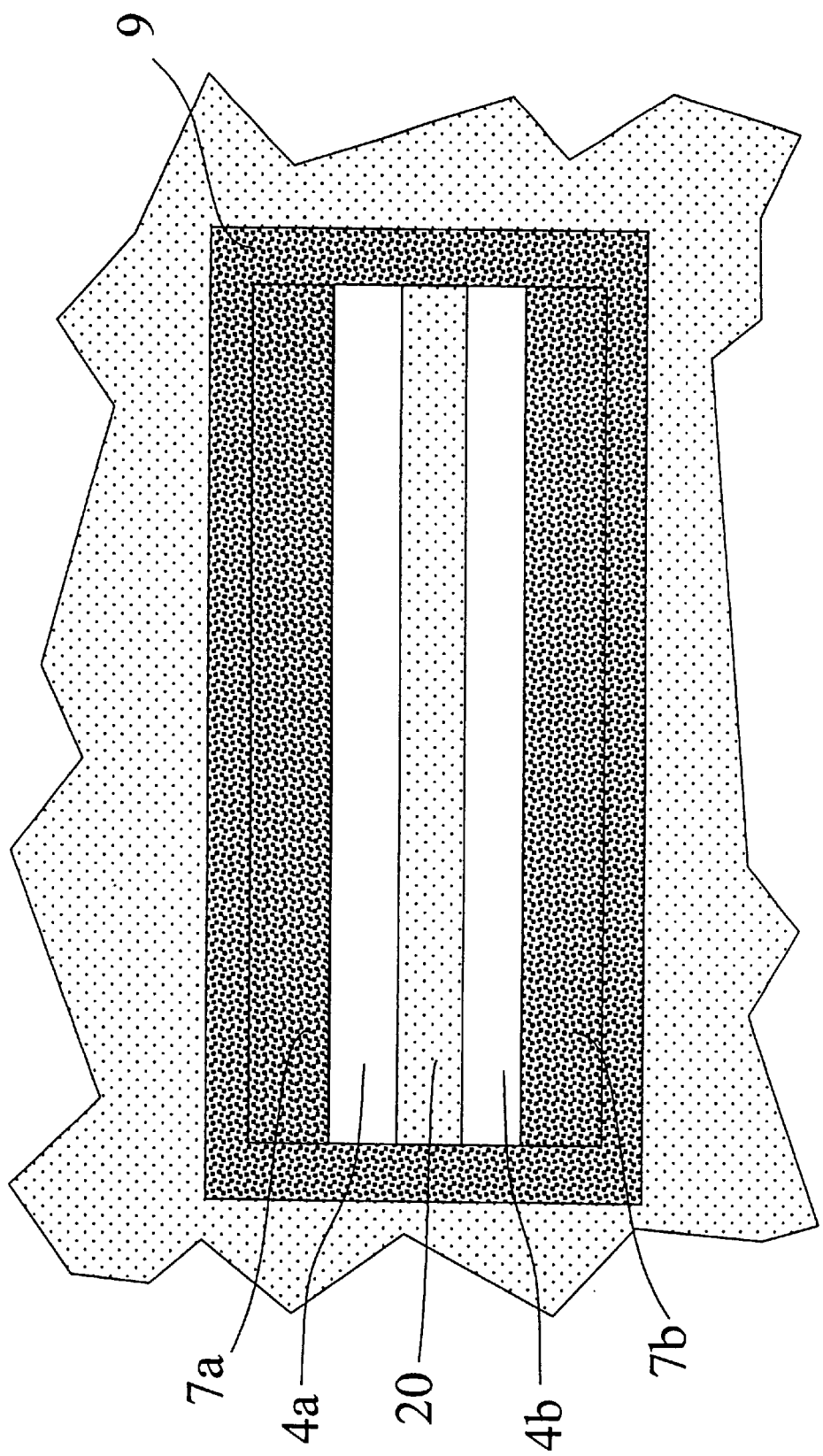
FIG. 20 shows a plan view of a fourth embodiment in accordance with the present invention with trenches open.
Figure 21:
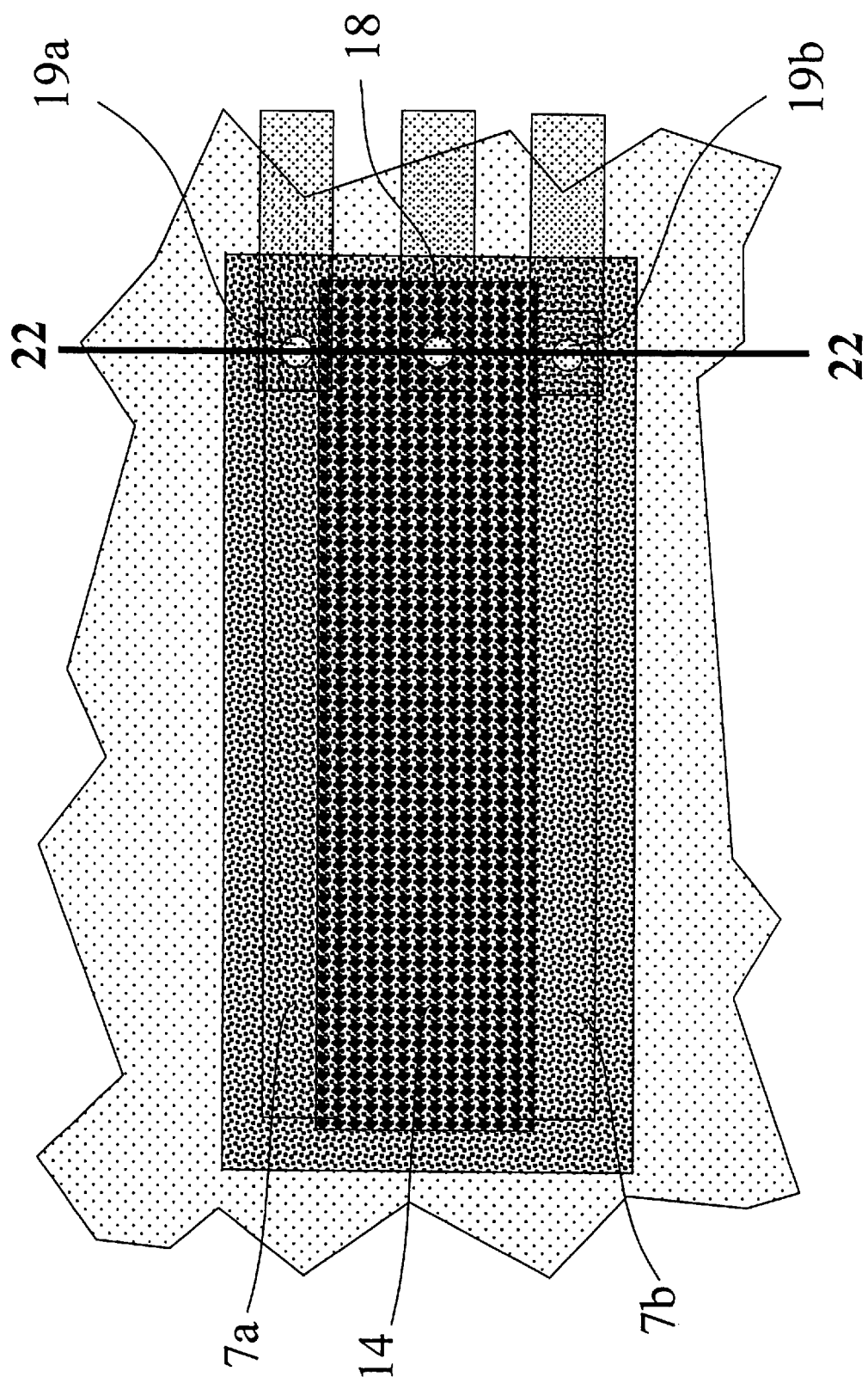
FIG. 21 is a further plan view of the device of FIG. 20 showing sealed trenches and application of electrical contacts.
Figure 22:
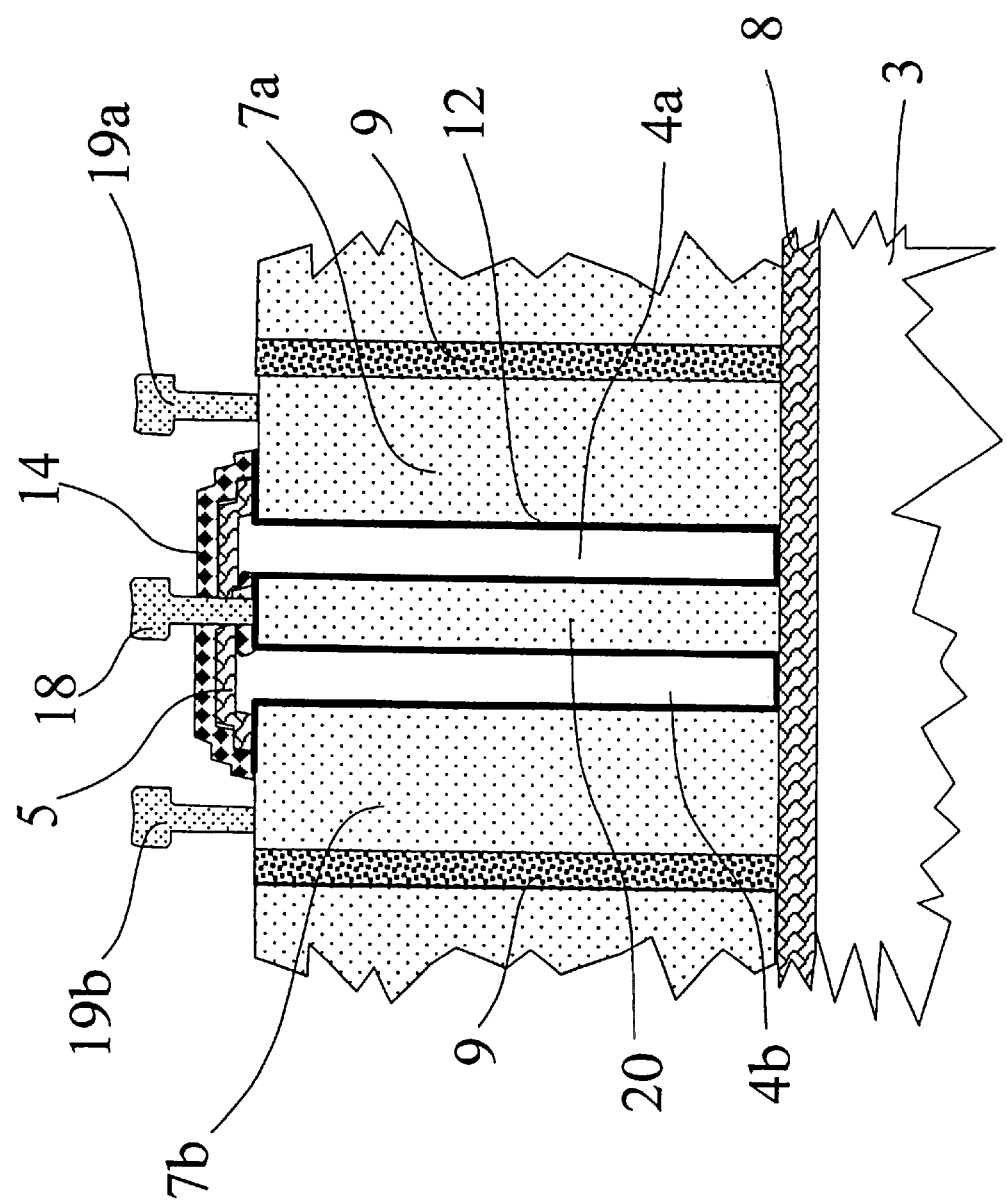
FIG. 22 is a section through the device of FIG. 21 along the line 22—22.

FIGS. 20 to 22 illustrate a fourth embodiment of the present invention and the same reference numerals will be used with reference to equivalent structures. This fourth embodiment may be processed using the same process flow steps described above with reference to the description of the manufacture of the first embodiment, the difference being in the application of different masks so as to achieve a variation on the finished structure.

As shown in FIG. 20, the isolation trench 9 is formed initially previously described with reference to the other embodiments and will serve to isolate the final structure from surrounding circuitry. Trenches 4a and 4b are the etched down to the buried oxide in a pattern that results in a beam of silicon 20 being formed. Using the sealing process already described, these etched trenches are then sealed with a cap 5 to form two vacuum cavities 4a and 4b around the silicon beam 20. Standard IC processing techniques are preferably used to realise an electrical contact 18 to the isolated silicon column and electrical contact 19a and 19b to the enclosing silicon 7a and 7b inside the isolation trench 9, as shown in FIG. 21.

FIG. 22 is a cross-section representation of FIG. 21 along the 22—22 plane. An electrical signal applied between the electrical contacts 18 and 19a or 19b generates an electrostatic field resulting in a vibration of the beam 20.

The structure of the present invention can be used to realise a pressure sensor, i.e., utilising the feature that the deformation of the diaphragm is a function of applied pressure. As the diaphragm deflection increases with applied pressure, the effective dielectric thickness decreases so the capacitance of the structure varies with deflection. This capacitance variation as a function of pressure can be easily measured, thereby implementing a pressure transducer or sensor.

This structure may also be applied as an actuator circuit element where an electrical signal drives vibration of the diaphragm. This structure has applications as a resonator in a circuit or to produce ultrasound or other signals, as described in conjunction with the third embodiment.

An advantage of the device of the present invention is that only the "edge" of the sensor consumes active surface silicon. This is a very small area compared to the total size of the diaphragm, and therefore it costs very little in terms of silicon area to integrate this sensor onto an integrated circuit.

There has been described herein an electromechanical element which is improved over the prior art. It will be apparent to those skilled in the art that modifications may be made without departing from the spirit and scope of the invention. Accordingly, it is not intended that the invention be limited except as may be necessary in view of the appended claims.

What is claimed is:

1. An integrated circuit comprising:
   a substrate having an upper surface defining a first plane;
   an electromechanical element including a deformable element defining a second plane which intersects the first plane and wherein the deformable element is deformable in a direction perpendicular to the second plane.

2. The integrated circuit of claim 1, wherein the first and second planes are substantially perpendicular with respect to one another.

3. The integrated circuit of claim 2, wherein the electromechanical element is insulated from the upper surface of the substrate.

4. The integrated circuit of claim 1, wherein the electromechanical element is a transducer element responsive to applied pressure, said applied pressure effecting a change in the electrical characteristics of said transducer.

5. The integrated circuit of claim 4 wherein the deformable element is a transducer diaphragm forming a first wall of an evacuated cavity, an outer portion of the first wall being exposed to ambient pressure conditions and an inner portion of the first wall being exposed to an evacuated cavity, such that changes in ambient pressure with respect to the evacuated cavity effect a deflection of the diaphragm, such deflection being electrically measurable.

6. The integrated circuit of claim 1 wherein the deformable element forms a first wall of an evacuated cavity, the cavity having a second wall, the second wall of the cavity being electrically insulated from the first wall, such that on application of a signal between the first wall and the second wall the deformable element is actuated, the actuation of the deformable element resulting in the deformable element vibrating mechanically.

7. The integrated circuit of claim 6 wherein the frequency of the deformable element vibration is modulated by the frequency of the signal applied to the first wall and second wall.

8. An integrated circuit comprising:
   a substrate having an upper surface,
   an electromechanical element formed on the upper surface, the electromechanical element being elongated in a direction substantially perpendicular to the substrate upper surface.

9. The integrated circuit of claim 8, wherein the electromechanical element is insulated from the upper surface of the substrate.

10. The integrated circuit of claim 8, wherein the electromechanical element forms a transducer being responsive to applied pressure, said applied pressure effecting a change in the electrical characteristics of said transducer.

11. The integrated circuit of claim 10, wherein said change in electrical characteristics of said transducer is independent of the electrical characteristics of the remaining portion of the integrated circuit.

12. The integrated circuit of claim 8, wherein the electromechanical element comprises a deformable element formed in a plane substantially perpendicular to the substrate.

13. The integrated circuit of claim 12, wherein the electromechanical element further comprises at least one evacuated cavity.

14. The integrated circuit of claim 13, having one evacuated cavity, the deformable element forming a first wall of said evacuated cavity, and wherein an outer portion of the deformable element is exposed to ambient pressure, and an inner portion of the deformable element is exposed to the evacuated cavity such that changes in ambient pressure with respect to the evacuated cavity effects a deflection of the diaphragm in the vertical plane, such deflection being electrically measurable.

15. The integrated circuit of claim 13, wherein the deformable element forms a first wall of the cavity and the cavity has a second wall electrically insulated from the first wall, such that the application of a signal between the first wall and the second wall actuates the deformable element.

16. The integrated circuit of claim 13 having two evacuated cavities, the deformable element forming a wall between the two evacuated cavities, the deformable element wall forming an inner wall of each cavity, each cavity also having an outer wall electrically insulated from the inner wall, such that an application of a signal between the inner wall and outer wall of either cavity actuates the deformable element.

17. The integrated circuit of claim 12 further comprising an evacuated cavity and wherein the deformable element is a column having a base and side walls formed within the cavity, the base of the column being proximal to the upper surface of the substrate of the integrated circuit, the column extending upwardly from the upper surface of the substrate, the side walls of the column being exposed to the cavity.

18. An integrated circuit having:
   a substrate,
   an electromechanical element formed on the substrate; the electromechanical element having a deformable element formed in a substantially perpendicular plane with respect to the substrate and deformable in a direction substantially perpendicular to said plane, the electromechanical element further comprising at least one sealed cavity, at least a portion of the deformable element being exposed to the sealed cavity, and
   wherein a deformation of the deformable element effects a change in the electrical characteristics of the electromechanical element.

19. A method of forming an electromechanical element having a deformable element and at least one evacuated cavity onto an integrated circuit substrate comprising the steps of:
   a) masking at least a portion of an active device layer of the integrated circuit,
   b) etching the device layer through the mask,
   c) sealing at least a portion of the etched device layer so as to effect the formation of the at least one evacuated cavity within the active device layer, and wherein the etching of the device layer through the mask effects the formation of at least one deformeable element, the element being deformable in a plane substantially perpendicular to the substrate of the integrated circuit.

20. The method according to claim 19 wherein the step of etching the device layer effects the formation of one deformable element, and the deformable element forms a wall of the at least one evacuated cavity.

21. The method according to claim 20 where in the steps of etching the device layer and sealing of the etched portion effects the formation of two cavities in the active device layer, the deformable element being formed as a shared wall between the two cavities.

22. The method according to claim 19 wherein the step of etching the device layer effects the formation of one deformable element within the at least one cavity.

23. The method according to claim 19 further comprising the step of electrically isolating the electromechanical element from the remaining integrated circuit.

24. A method of measuring pressure using an integrated transducer comprising the steps of:
   a) forming at least one evacuated cavity in an active device layer of the integrated circuit,
   b) isolating at least one wall of the at least one cavity from the active device layer of the integrated circuit so as to form a deformable element, the wall being formed in a plane substantially perpendicular to a substrate surface of the integrated circuit,
   c) exposing at least one wall of the cavity to ambient pressure conditions so as to form a deformable membrane, and
   d) sensing any deformation of the deformable element resultant in fluctuations in pressure between the ambient pressure and the evacuated cavity.

25. A method of forming an actuator on an integrated circuit comprising the steps of:
   a) forming at least one evacuated cavity in an active device layer of the integrated circuit,
   b) forming a deformable element in a plane substantially perpendicular to a substrate of the integrated circuit, at least a portion of the deformable element being exposed to the evacuated cavity, and
   c) applying a signal between the deformable element and a wall of the evacuated cavity, said applied signal actuating the deformable element so as to generate a wave, the characteristics of the wave being defined by the applied signal.

26. The method according to claim 25 wherein the deformable element is formed by isolating at least one wall of the at least one cavity from the active device layer of the integrated circuit such that the deformable element forms a first wall of the cavity and the applied signal is applied between this first wall and a second wall of the cavity.

* * * * *